United States Patent [19]

Funyu

[11] Patent Number: 5,689,694
[45] Date of Patent: Nov. 18, 1997

[54] DATA PROCESSING APPARATUS PROVIDING BUS ATTRIBUTE INFORMATION FOR SYSTEM DEBUGGING

[75] Inventor: Masami Funyu, Kanagawa-ken, Japan

[73] Assignee: Kabushiki Kaisha Toshiba, Kawasaki, Japan

[21] Appl. No.: 10,016

[22] Filed: Jan. 27, 1993

[30] Foreign Application Priority Data

Jan. 28, 1992 [JP] Japan .................... 4-013012

[51] Int. Cl.$^6$ .................... G06F 9/40; G06F 11/30
[52] U.S. Cl. .................... 395/581; 395/183.21
[58] Field of Search .................... 395/555, 800, 395/581, 183.21

[56] References Cited

U.S. PATENT DOCUMENTS

| | | | |
|---|---|---|---|
| 4,084,228 | 4/1978 | Dufond | 364/650 |
| 4,085,448 | 4/1978 | Kogge | 395/325 |
| 4,992,932 | 2/1991 | Toshiharu | 395/375 |
| 5,127,091 | 6/1992 | Boufarah | 395/375 |
| 5,305,389 | 4/1994 | Palmer | 382/1 |
| 5,440,722 | 8/1995 | VanderSpek | 395/183.19 |

OTHER PUBLICATIONS

MC68040 32–BIT, Microprocessor User's Manual, Sec. 5.9.1 "Processor Status".

*Primary Examiner*—David Y. Eng
*Attorney, Agent, or Firm*—Foley & Lardner

[57] ABSTRACT

The data processing apparatus which outputs information regarding the prefetching of an instruction in the destination of a branch instruction prior to the confirmation of its branch condition. The apparatus uses the output information to delete unexecuted memory access from a trace memory so as to accurately trace the execution sequence of the apparatus by an incircuit emulator. Bus attribute information is output which indicates that the bus cycle under operation is an instruction fetch bus cycle in the destination of a branch instruction. Additionally, status information regarding a prefetched instruction in the destination of a branch instruction is used in order to invalidate the prefetched instruction.

8 Claims, 22 Drawing Sheets

FIG.5a

| OFREQ | OSREQ | TGREQ | IFREQ | OUTPUTS FROM REQUEST ENCODE CIRCUIT |
|---|---|---|---|---|
| 1 | * | * | * | OPERAND FETCH BUS CYCLE |
| 0 | 1 | * | * | OPERAND STORE BUS CYCLE |
| 0 | 0 | 1 | * | INSTRUCTION FETCH BUS CYCLE IN A BRANCH DESTINATION |
| 0 | 0 | 0 | 1 | INSTRUCTION FETCH BUS CYCLE |

\* : don't care

FIG.5b

| BAT0 | BAT1 | ATTRIBUTES OF BUS OPERATIONS |
|---|---|---|
| 0 | 0 | INSTRUCTION FETCH BUS CYCLE |
| 0 | 1 | INSTRUCTION FETCH BUS CYCLE IN A BRANCH DESTINATION |
| 1 | 0 | OPERAND FETCH BUS CYCLE |
| 1 | 1 | OPERAND STORE BUS CYCLE |

FIG.5c

| BSTATE0 | BSTATE1 | STATES OF BUS OPERATIONS |
|---|---|---|
| 0 | 0 | $S_i$ CYCLE |
| 0 | 1 | $S_1$ CYCLE |
| 1 | 0 | $S_2$ CYCLE |
| 1 | 1 | (RESERVED) |

REQ=OFREQ+OSREQ+TGREQ+IFREQ

FIG.7a

| PIPE LINE STAGE | TIME | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| IF | 1.2 | 3 | 4.5 | — | 6.7 | — | 6.7 | 8.9 | 5 | 6.7 | 8.9 | 10.11 |
| D | | 1 | 2 | 3 | 4 | | | 6 | | 5 | 6 | 7 |
| A | | | 1 | 2 | 3 | 4 | | | | | 5 | 6 |
| F | | | | 1 | 2 | 3 | 4 | | | | | 5 |
| E | | | | | 1 | 2 | 3 | 4 | | | | |

IFREQ

TREQD

OFREQ

FIG.7b

TREQE

OSREQ

TGREQ

TGCAN

CAN

| BAT0,1 | 0 | 0 | 0 | 2 | 0 | 2 | 1 | 0 | 0 | 0 | 0 | 0 |
| A | 2000 | 2004 | 2008 | 4004 | 200C | 4000 | 200C | 2010 | 200A | 200C | 2010 | 2014 |

FIG.8

| Address | Code/Data | BUS Status | Target Cancel |
|---------|-----------|------------|---------------|
| 00002000 | 12765A54 | Instruction Fetch | - - - |
| 00002004 | 12094000 | Instruction Fetch | - - - |
| 00002008 | 8C026655 | Instruction Fetch | ★2 |
| 00004004 | 00230456 | Data Read | - - - |
| 0000200C | 12B64656 | Instruction Fetch | ★2 |
| 00004000 | 00000041 | Data Read | - - - |
| 0000200C | 12B64656 | Target Fetch | ★1 |
| 00002010 | C2158C0E | Instruction Fetch | ★1 |
| 0000200A | xxxx6655 | Instruction Fetch | Cancel |
| 0000200C | 12B64656 | Instruction Fetch | - - - |
| 00002010 | C2158C0E | Instruction Fetch | - - - |
| 00002014 | 1244BF14 | Instruction Fetch | - - - |

FIG.9

| Address | Code/Data | Line | Statement | | |
|---------|-----------|------|-----------|------|------|
| 00002000 | 1276 | 1 | Lab3 : | MOV | @(R6), R4 |
| 00002002 | 5A54 | 2 | | ADD | #6, R4 |
| 00002004 | 12094000 | 3 | | CMP | @Mem1, R4 |
| 00002008 | 8C02 | 4 | | BEN | Lab1 |
| 00004004 | 00230456 | | | (Data Read) | |
| 00004000 | 00000041 | | | (Data Read) | |
| 0000200A | 6655 | 5 | | SUB | #1, R5 |
| 0000200C | 12B6 | 6 | Lab1 : | MOV | R4, @(R6) |
| 0000200E | 4656 | 7 | | ADD | #1, R6 |
| 00002010 | C215 | 8 | | CMP | #0, R5 |
| 00002012 | 8C0E | 9 | | BNE | Lab2 |
| 00002014 | 1244 | 10 | | MOV | @SP+, R4 |
| 00002016 | BF148214 | 11 | | CMP | #20, R4 |

FIG.19

| Address | Code | Line | Statement | |
|---|---|---|---|---|
| 00002000 | 1276 | 1 | | MOV @(R6), R4 |
| 00002002 | 5A54 | 2 | | ADD #6, R4 |
| 00002004 | 12094000 | 3 | | CMP @Mem1, R4 |
| 00002008 | 8C02 | 4 | | BEN Lab1 |
| 0000200A | 6655 | 5 | | SUB #1, R5 |
| 0000200C | 12B6 | 6 | Lab1 : | MOV R4, @(R6) |
| 0000200E | 4656 | 7 | | ADD #1, R6 |
| 00002010 | C215 | 8 | | CMP #0, R5 |
| 00002012 | 8C0E | 9 | | BNE Lab2 |
| 00002014 | 1244 | 10 | | MOV @SP+, R4 |
| 00002016 | BF148214 | 11 | | CMP #20, R4 |

FIG.20

| PIPE LINE STAGE | TIME | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| IF | 1.2 | 3 | 4.5 | — | 6.7 | — | 6.7 | 8.9 | 5 | 6.7 | 8.9 | 10.11 |
| D | | 1 | 2 | 3 | 4 | | | 6 | | 5 | 6 | 7 |
| A | | | 1 | 2 | 3 | 4 | | | | | 5 | 6 |
| F | | | | 1 | 2 | 3 | 4 | | | | | 5 |
| E | | | | | 1 | 2 | 3 | 4 | | | | |

INSTRUCTION PREFETCH IN A BRANCH DESTINATION

FIG.21

| Address | Code/Data | BUS Status |
| --- | --- | --- |
| 00002000 | 12765A54 | Instruction Fetch |
| 00002004 | 12094000 | Instruction Fetch |
| 00002008 | 8C026655 | Instruction Fetch |
| 00004004 | 00230456 | Data Read |
| 0000200C | 12B64656 | Instruction Fetch |
| 00004000 | 00000041 | Data Read |
| 0000200C | 12B64656 | Instruction Fetch |
| 00002010 | C2158C0E | Instruction Fetch |
| 0000200A | xxxx6655 | Instruction Fetch |
| 0000200C | 12B64656 | Instruction Fetch |
| 00002010 | C2158C0E | Instruction Fetch |
| 00002014 | 1244BF14 | Instruction Fetch |

FIG.22

| Address | Code/Data | Line | Statement | | |
|---------|-----------|------|-----------|---|---|
| 00002000 | 1276 | 1 | | MOV | @(R6), R4 |
| 00002002 | 5A54 | 2 | | ADD | #6, R4 |
| 00002004 | 12094000 | 3 | | CMP | @Mem1, R4 |
| 00002008 | 8C02 | 4 | | BEN | Lab1 |
| 0000200A | 6655 | 5 | | SUB | #1, R5 |
| 00004004 | 00230456 | | | (Data Read) | |
| 0000200C | 12B6 | 6 | | MOV | R4, @(R6) |
| 0000200E | 4656 | 7 | | ADD | #1, R6 |
| 00004000 | 00000041 | | | (Data Read) | |
| 0000200C | 12B6 | 8 | Lab1: | MOV | R4, @(R6) |
| 0000200E | 4656 | 9 | | ADD | #1, R6 |
| 00002010 | C215 | 10 | | CMP | #0, R5 |
| 00002012 | 8C0E | 11 | | BNE | Lab2 |
| 0000200A | 6655 | 14 | | SUB | #1, R5 |
| 0000200C | 12B6 | 15 | Lab1: | MOV | R4, @(R6) |
| 0000200E | 4656 | 16 | | ADD | #1, R6 |
| 00002010 | C215 | 17 | | CMP | #0, R5 |
| 00002012 | 8C0E | 18 | | BNE | Lab2 |
| 00002014 | 1244 | 10 | | MOV | @SP+, R4 |
| 00002016 | BF148214 | 11 | | CMP | #20, R4 |

INSTRUCTIONS PURGED BY PRECEDENCE BRANCH (lines 6–7)

INSTRUCTION PREFETCH IN A BRANCH DESTINATION (lines 14–18)

DATA PROCESSING APPARATUS PROVIDING BUS ATTRIBUTE INFORMATION FOR SYSTEM DEBUGGING

BACKGROUND OF THE INVENTION

1. Field of the Invention

This invention relates to a data processing apparatus. In particular, it relates to a data processing apparatus which is capable of providing debugging information in order to facilitate system debugging.

2. Description of the Prior Art

In order to develop microprocessor (referred to as MPU, below) using system, development support system called an incircuit emulator is used in order to improve the developing performance. A conventional incircuit emulator has realtime trace facilities to display the instruction sequence of a program which is operated in realtime. The realtime trace facilities have the following function. First, the emulator once stores, into a trace memory, address bus signals, data bus signals, and bus control signals which are output from MPU in every bus operation. Then, the emulator analyzes the information stored in the trace memory after the execution of a program to be traced, thus allowing the display of the executed instructions and their addresses in addition to the addresses and data of memory operands which have been accessed by the instructions.

A high level MPU usually has an inside memory, which is called an instruction buffer, to execute an instruction fetch prior to the execution of instructions (i.e., prefetch). In the case where the execution order becomes non-sequential due to the execution of a branch instruction, the MPU having prefetch facilities restarts an instruction fetch from a valid instruction address, after purging out instructions which have been prefetched. Therefore, in such a MPU, there is no guarantee that fetched instructions must always be executed. As a result, the accurate trace of execution cannot be conducted only by observing signals outside the MPU.

In order to overcome the above mentioned disadvantage, an MC68040 from MOTOROLA INC outputs status information from an execution unit inside the MPU. The status information, however, is output synchronous with the execution of instructions, but not with bus operations. Accordingly, the information cannot be stored into a trace memory without changing their shapes. Such information should be made to synchronize with bus operations using any means so as to store them into a trace memory. Alternatively, another trace memory for use in execution of instructions should be provided in addition to the trace memory for use in bus operations. Status information is stored into the trace memory for use in execution of instructions in every machine cycle. The information stored in both trace memories is, then analyzed together. However, in both cases the hardware for those aims becomes complicated and huge.

As the performance of MPUs has become more sophisticated, various methods, for example, a pipe-line execution method, are used to improve their operation speed. Particularly, in order to execute branch instructions at high speed, prefetch of an instruction, which exists in the destination address of a branch instruction, and branch prediction techniques have been used. In these MPUs, the instruction in a branch destination should be prefetched prior to the confirmation of the branch conditions of the conditional branch instruction. If the branch conditions are not satisfied, the prefetched instruction in the branch destination should be purged and the other instructions in the continuation addresses of the conditional branch instruction should be fetched. As a result, the trace of execution sequence becomes very difficult only by observing external signals of an MPU.

For example, an M32/100 from Mitsubishi Electric Co. carries out precedence branch of a conditional branch instruction using a dynamic branch prediction table. In this device, whether the branch conditions are satisfied or not is predicted using the dynamic branch prediction table, after the decode of the Conditional branch instruction at an instruction decode (D) stage. If it is predicted that the branch conditions would be satisfied, the branch destination address is calculated first, and then, the instruction in the calculated address is fetched at an operand fetch stage. On the other hand, if it is confirmed that the branch conditions would not be satisfied, the instruction next to the conditional branch instruction should be fetched to restart the original execution sequence. In FIG. 16, the prediction mechanism of M32/100 is described.

In FIG. 17, the precedence branch mechanism of the M32/100 is shown. As shown in this figure, once a precedence branch instruction is decoded, switching between D stage displacement and D stage instruction length is carried out by a selector so as to calculate in a PC adder the branch destination address. On the other hand, in order to prepare for the case where branch prediction is missed the address of the next instruction is calculated in an operand address adder.

In FIG. 18, the mechanism of a pipe line process in M32/100 is shown. This pipe line process is comprised of five stages as follows: an instruction fetch (IF) stage; an instruction decode (D) stage; an operand address calculation (A) stage; an operand fetch (F) stage; and an execution (E) stage.

In FIG. 20, the flow of instructions in the respective stages of the pipe line is shown to execute a program shown in FIG. 19. In FIG. 20, numerals shown in each line of the respective stages correspond to the line numbers shown in FIG. 19. In the example shown in these figures, the fourth conditional branch instruction (BNE) is predicted to satisfy branch conditions, and then, its precedence branch (the instruction fetch at time 7) is executed. However, as a result of the execution, the branch instruction is found not to satisfy the branch conditions. Then, the other instruction which is next to the conditional branch instruction is fetched (the instruction fetch at time 10). In FIG. 21, trace informations stored in the trace memory are shown as a result of the program execution shown in FIG. 19. The result of simple reverse assembly of the trace informations shown in FIG. 21 is described in FIG. 22. However, it is very difficult from this figure to find the actual execution sequence due to the interruption by prefetched instructions in branch destinations.

As explained above, in the prior art data processing apparatus in which various methods of speeding up the execution of branch instructions, such as the prefetch of instructions in branch destinations or the branch prediction, are adopted, the exact instruction trace cannot be made only by observing external signals of the apparatus.

SUMMARY OF THE INVENTION

The present invention was made to overcome the above mentioned problem of the prior art data processing apparatus.

Therefore, the objective of the present invention is to provide a data processing apparatus which has facilities for exactly tracing and analyzing the execution sequence of the present apparatus using an incircuit emulator.

Another objective of the present invention is to provide a data processing apparatus having facilities for prefetching an instruction in the destination of a branch instruction prior to the confirmation of its branch condition, the apparatus which is capable of exactly tracing and analyzing the execution sequence of the present apparatus using an incircuit emulator.

Still another objective of the present invention is to provide a data processing apparatus which has facilities for exactly tracing and analyzing the execution sequence of the present apparatus using an incircuit emulator, as well as for fetching instructions arising after a unconditional or conditional branch instruction with smaller number of cycles.

The first feature of the present invention is to provide a data processing apparatus having means 1 for outputting bus attribute information which indicate that the bus cycle under operation is an instruction fetch cycle in the destination of a branch instruction, as shown in FIG. 1.

The second feature of the present invention is to provide a data processing apparatus having facilities for prefetching an instruction in the destination of a branch instruction prior to the confirmation of its branch conditions, which is comprised of the following: first means 1 for outputting bus attribute informations which indicate that the bus cycle under operation is an instruction fetch cycle in the destination of said conditional or unconditional branch instruction; and second means 3 for outputting status information regarding said prefetched instruction in the destination of said conditional branch instruction synchronous with bus cycles, in order to invalidate said prefetched instruction in the destination when said conditional branch instruction is determined not to satisfy its branch conditions as a result of the execution of this conditional branch instruction, as shown in FIG. 1.

The third feature of the present invention is to provide a data processing apparatus as shown in FIG. 2, which is comprised of the following: address and data buses ABUS and DBUS; memory means 101 for holding programs in which a plurality of instructions are included; data processing unit 11 which operates according to the instructions read out from said memory means 101, said data processing unit 11 having means 1 for outputting bus attribute information which indicate that the bus cycle under operation is an instruction fetch cycle in the destination of a unconditional or conditional branch instruction; and address generating means 13 for producing addresses to access said memory means 101, said address generation means 13 further comprising addition means 16 for adding n (byte number of data bus width) to the values on said address bus, address storing means 17 for holding the output from said addition means 16, and address selecting means 18 for selecting either the values on said address bus ABUS or the values stored in said address storing means 17.

According to said first feature of the present invention, means 1 outputs information which indicates that the bus cycle under operation is an instruction fetch bus cycle in the destination of a branch instruction. Based on this informations, an incircuit emulator, which is used to trace the execution sequence of the present apparatus, can delete prefetched instruction part, which has been purged due to the execution of branch instructions, from a trace memory. As a result, the trace and analysis of the execution sequence can be carried out easily by said incircuit emulator.

According to said second feature of the present invention, said means 1 outputs bus attribute information which indicates that the bus cycle under operation is an instruction fetch bus cycle in the destination of a unconditional or conditional branch instruction. In addition, said second means 3 outputs, synchronous with bus cycles, information which indicates that the prefetched instruction in the destination of the conditional branch instruction should be invalidated due to the branch conditions of said branch instruction being not true. Therefore, according to the information output from said means 1, an incircuit emulator can delete the prefetched instruction part which has been purged as a result of the execution of precedence branch, from a trace memory in order to trace and analyze the execution sequence of the present apparatus. Also, according to the information output from said second means 3, said incircuit emulator can delete prefetched instruction part in the destination of a branch instruction, said part which has been purged due to the incompletion of branch conditions which is not true. As a result, the incircuit emulator can easily trace and analyze the execution sequence of the present apparatus.

According to said third feature of the present invention, said address generation means 13 adds n to the values on address bus ABUS using addition means 16, and stores the resulting values into address storing means 17, when said means 1 indicates that the bus cycle under operation is an instruction fetch bus cycle in the destination of a unconditional or conditional branch instruction. Therefore, if an instruction, which is next to said conditional or unconditional branch instruction, must be fetched, address selector 18 may select the values stored in address storing means 17 in order to obtain the address of said next instruction and to access memory means 101.

As a result, it becomes possible to fetch an instruction, which arises after said conditional or unconditional branch instruction, with smaller number of cycles. So, the system performance of this apparatus is greatly improved.

These and other objectives, features, and advantages of the present invention will be more apparent from the following detailed description of preferred embodiments taken in conjunction with the accompanying drawings.

BRIEF DESCRIPTION OF THE DRAWINGS

FIG. 5a is a view explaining the operation of the request encode circuit shown in FIG. 4;

FIG. 5b is a view explaining the attribute informations of bus operations obtained from bus attribute information F/Fs shown in FIG. 4;

FIG. 5c is a view explaining the states of bus operations obtained from bus state F/Fs shown in FIG. 4;

FIG. 6b is a timing chart explaining the state transition shown in FIG. 6a;

FIG. 7a is a view explaining the pipe line flow in which the program shown in FIG. 19 is executed using the data processing apparatus of the first embodiment;

FIG. 7b is a timing chart explaining the pipe line flow shown in FIG. 7a;

FIG. 8 is a view showing the trace information stored in a trace memory when the program shown in FIG. 19 is executed using the data processing apparatus of the first embodiment;

FIG. 9 is a view showing the analyzed result of trace informations obtained in the case where the program shown in FIG. 19 is executed by the data processing apparatus of the first embodiment;

FIG. 19 is a view showing an example of a program to be traced;

FIG. 20 is a view explaining the pipe line flow which is obtained by executing the program shown in FIG. 19 using the prior art data processing apparatus;

FIG. 21 is a view showing trace informations which are stored in a trace memory when the program shown in FIG. 19 is executed using the prior art data processing apparatus; and FIG. 22 is a view showing the analyzed result of trace informations obtained by executing the program shown in FIG. 19 using the prior art data processing apparatus.

DETAILED DESCRIPTION OF PREFERRED EMBODIMENTS

Figure 1:
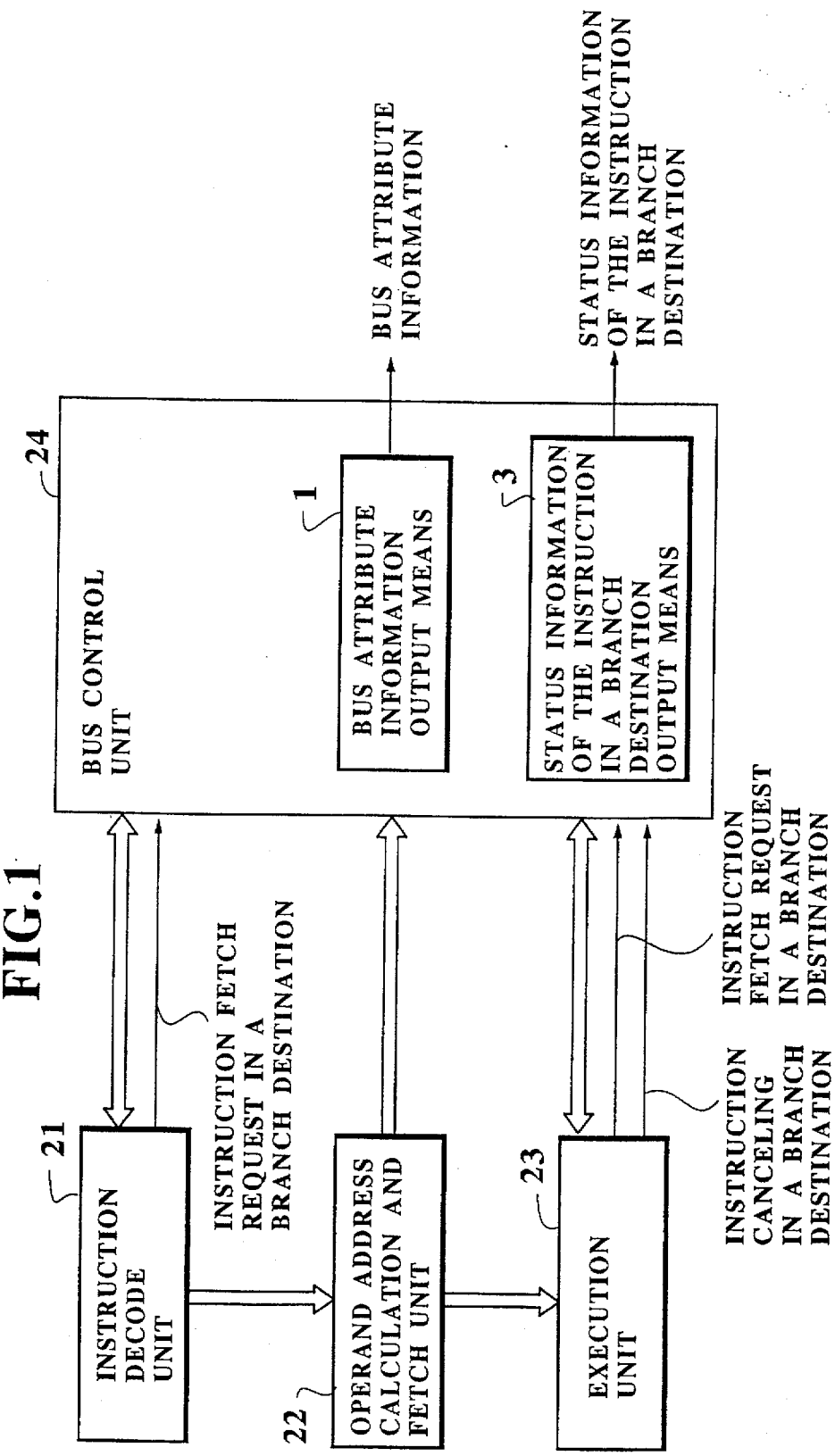
FIGS. 1 and 2 are views showing the principle structures of the present invention.
Figure 2:
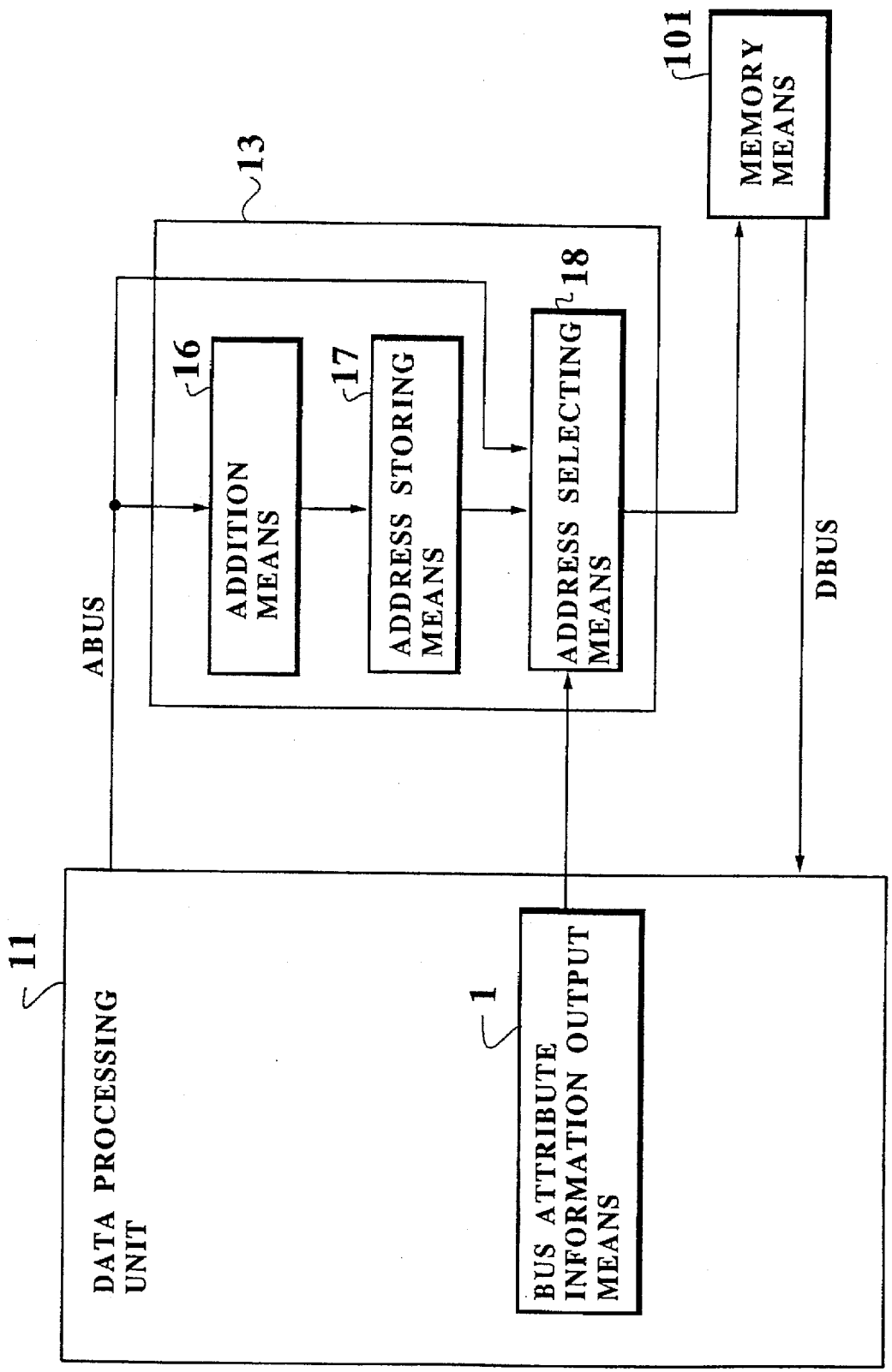
Figure 3:
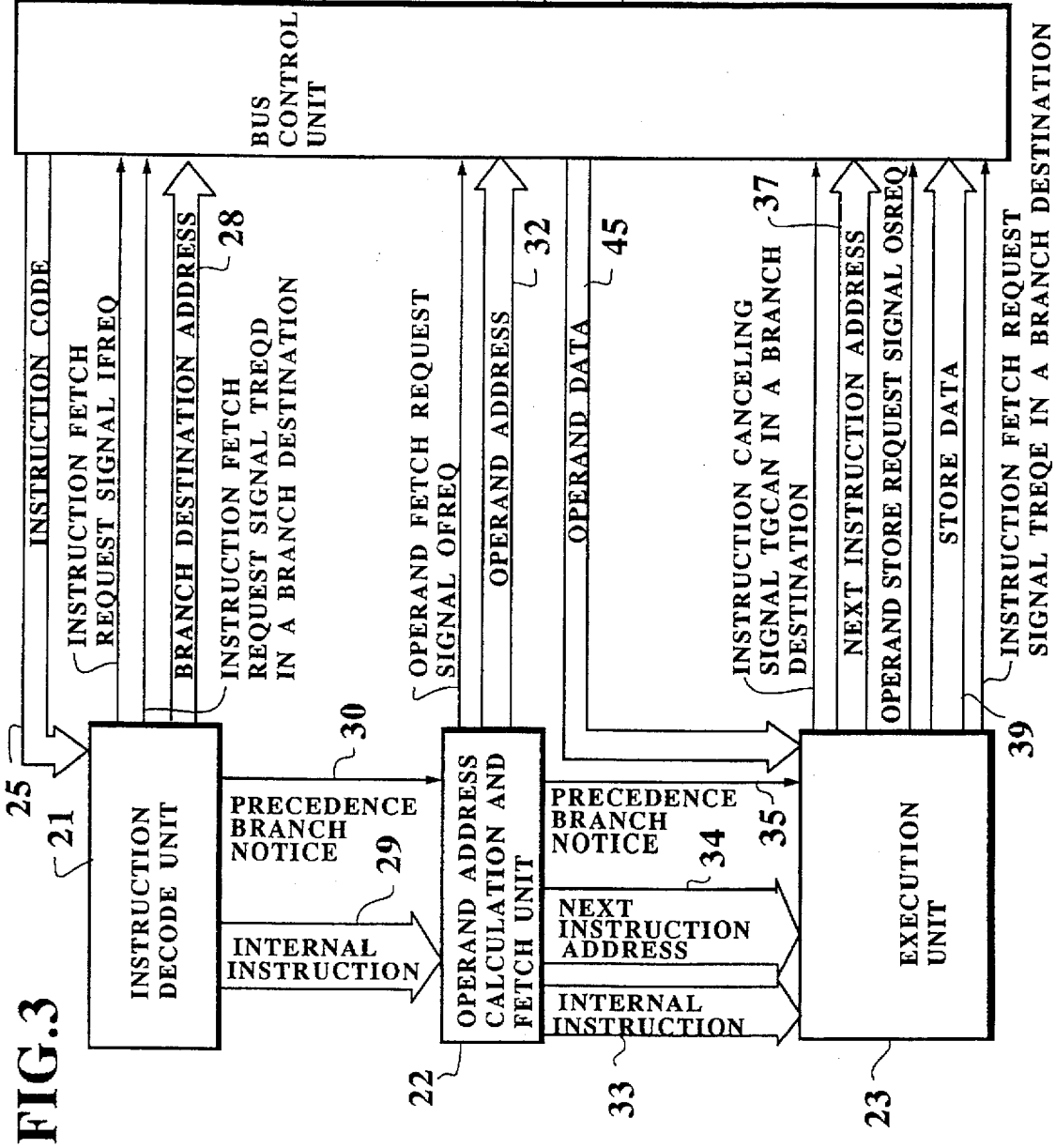
FIG. 3 is a schematic diagram of a data processing apparatus according to the first embodiment of the present invention.

FIG. 3 shows the outline structure of a data processing apparatus according to the first embodiment of the present invention.

As shown in FIG. 3, the data processing apparatus of this embodiment is comprised of the following: an instruction decode unit 21; an operand address calculation and fetch unit 22; an execution unit 23; and a bus control unit 24. Unit 21 conducts branch prediction and precedence branching of a branch instruction in addition to the decode of instructions. Unit 22 calculates the fetch. Unit 23 executes instructions so as to request operand store. Further, said unit 24 executes bus cycles according to an instruction fetch request signal IFREQ from unit 21, an operand fetch request signal OFREQ from unit 22, and an operand store request signal OSREQ from unit 23.

The operation of the data processing apparatus mentioned above will be explained below.

When instruction decode unit 21 gives instruction fetch request signal IFREQ into bus control unit 24, this unit 24 executes an instruction fetch bus cycle, and then, sends a fetched instruction code 25 into instruction decode unit 21. After receiving the instruction code 25, unit 21 decodes it into an internal instruction 29, so as to send it to unit 22.

In the case where a memory operand is designated by internal instruction 29, unit calculates the address of the memory operand according to the internal instruction and sends operand address 32 into bus control unit 24. If said operand is a read operand, unit 22 outputs operand fetch request signal OFREQ into bus control unit 24. In this case, bus control unit 24 executes an operand fetch bus cycle, and sends fetched operand data 45 to the execution unit 23. At the same time, unit 22 sends the internal instruction 33 into unit 23.

Unit 23 executes instructions according to the internal instruction 33. When the destination operand of an executed instruction is a memory operand, unit 23 sends store data 39 and operand store request signal OSREQ into bus control unit 24. Receiving signal OSREQ from unit 23, bus control unit 24 executes an operand store bus cycle, thus allowing store data 39 output from unit 23 to be written into a memory.

Figure 16:
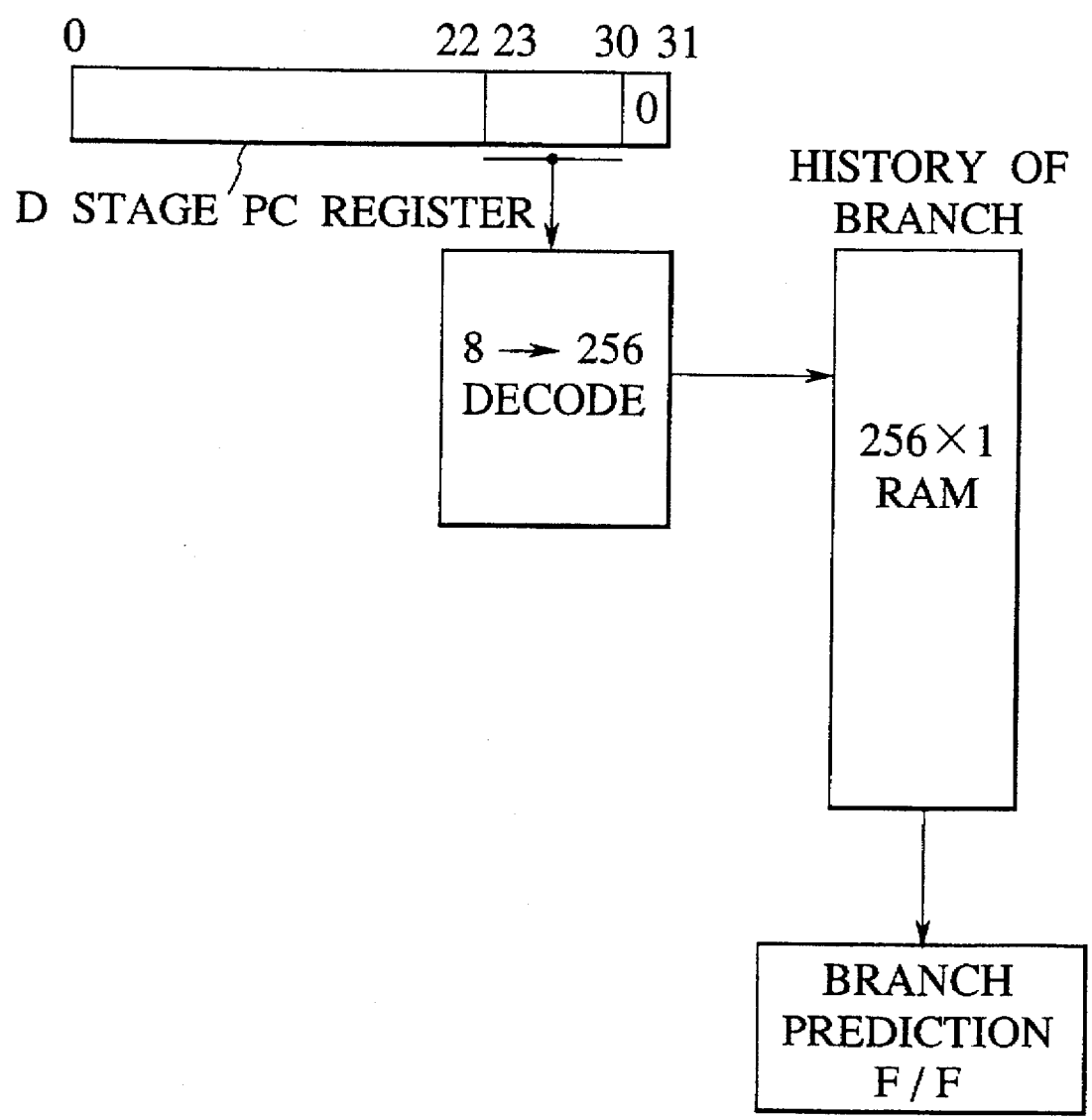
FIG. 16 is a schematic diagram showing the structure of a branch prediction mechanism used in a prior art data processing apparatus.
Figure 17:
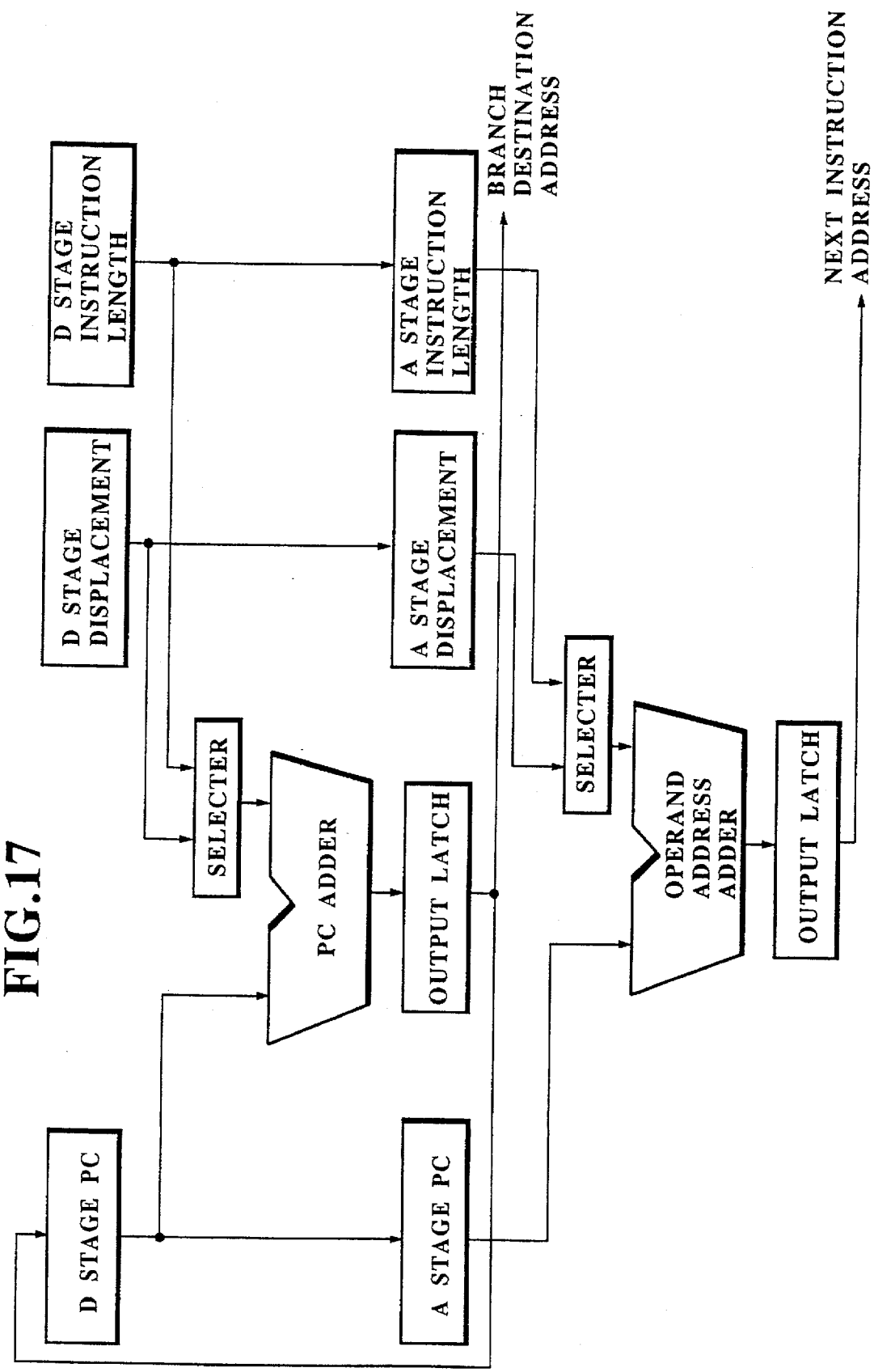
FIG. 17 is a schematic diagram showing the structure of a precedence branch mechanism used In the prior art data processing apparatus.
Figure 18:
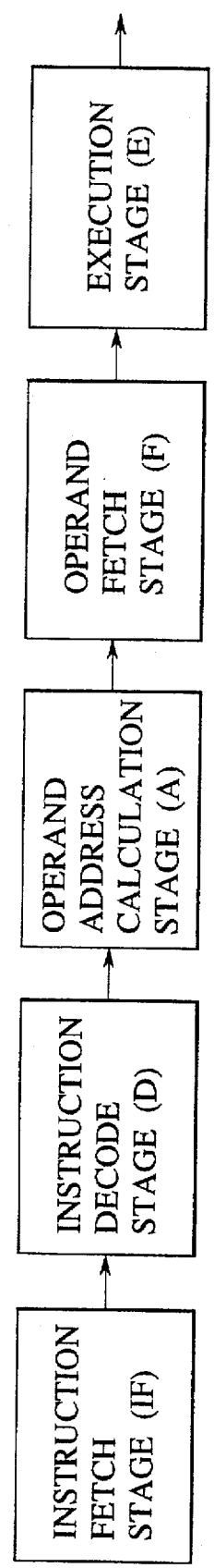
FIG. 18 is a block diagram showing the structure of a pipe line processing mechanism used in the prior art data processing apparatus.

When the instruction decoded by unit 21 is a conditional branch instruction, unit 21 predicts whether the instruction will satisfy its branch conditions or not, using a branch prediction table. The branch prediction system shown in FIG. 16 and the precedence branch system shown in FIG. 17 may be used in this embodiment. When unit 21 predicts that the instruction will satisfy the branch conditions, unit 21 adds a PC value to a displacement value of branch conditions in order to obtain a destination address 28 which is to be sent to bus control unit 24. At the same time, unit 21 gives an instruction fetch request signal TREQD of the branch destination to unit 24. Unit 21 also outputs a precedence branch notice 30 to unit 22, in order to notify that the precedence branch of a conditional branch instruction has been executed in unit 21. On the other hand, when unit 21 predicts that the instruction will not satisfy the branch conditions, this unit 21 adds the PC value to the instruction length of the conditional branch instruction in order to obtain the address of the instruction next to the conditional branch instruction. In this case, unit 21 does not output precedence branch notice 30. When unit 21 outputs instruction fetch request signal TREQD of a branch destination to unit 24, this unit 24 executes an instruction fetch bus cycle of the branch destination, and then, sends fetched instruction code 25 into unit 21.

Once unit 21 has output precedence branch notice 30 into unit 22, this unit 22 adds the PC value of a conditional branch instruction to the instruction length of the conditional branch instruction, so as to find the next instruction address 34 which should be executed next only when said branch instruction does not satisfy the branch conditions. This address 34 is then sent to execution unit 23. In order to notify unit 23 that the precedence branch of a conditional branch instruction has been executed in unit 21, unit 22 also outputs precedence branch notice 35 into unit 23.

In this above apparatus, if there was no output of precedence branch notice 30 when the instruction specified by internal instruction 29 is a conditional branch instruction, unit 22 adds the PC value to the displacement value of the conditional branch instruction to find the branch destination address. This address will be sent to execution unit 23 as instruction address 34 to be executed next.

In the case where the instruction specified by the internal instruction 33 is a conditional branch instruction, execution unit 23 compares the flag of a processor status register with the branch conditions contained in the conditional branch instruction, and decides whether the branch instruction should satisfy the branch condition or not. When the branch instruction is judged to satisfy the branch condition during the output of precedence branch notice 35, the instruction, which is in the branch destination address and has been prefetched as a result of precedence branch, will be executed. On the other hand, when the branch instruction is judged not to satisfy the branch condition, unit 23 sends the next instruction address 37 and an instruction cancelling signal TGCAN of the branch destination into bus control unit 24. In the case where the branch instruction is judged to satisfy the branch condition without the output of precedence branch notice 35, unit 23 outputs the branch destination address into bus control unit 24 as the next instruction address 87. At the same time, unit 23 outputs instruction fetch request signal TREQE of the branch destination. In the case where the branch instruction is judged not to satisfy the branch condition without the output of precedence branch notice 35, the other instruction next to the branch instruction, which has been prefetched, will be executed. When unit 23 outputs instruction cancelling signal TGCAN of a branch destination into bus control unit 24, this unit 24 outputs a signal CAN to invalidate the prefetched instruction of a branch destination, and then, executes an instruction fetch bus cycle of the instruction address designated by next instruction address 37. Then, unit 24 sends fetched instruction code 25 into instruction decode unit 21. When unit 23 outputs instruction fetch request signal TREQE of a branch destination into bus control unit 24, this unit 24 executes an instruction fetch bus cycle of a branch destination, thus outputting a fetched instruction code into instruction decode unit 21.

Next, the detailed operation of this embodiment will be described with referring to FIG. 4. In this figure, the detailed circuit of bus control unit 24 is shown according to the first embodiment of the present invention.

A signal TGREQ is obtained by taking a logical OR between two signals TREQD and TREQE, each of which requests instruction fetch of a branch destination respectively. This signal TGREQ, instruction fetch request signal IFREQ, operand fetch request signal OFREQ, and operand store request signal OSREQ are then input to a request encode circuit 51. In this circuit 51, a request having the highest priority is encoded first according to the conditions shown in FIG. 5a. In the case shown in FIG. 5a, operand fetch request signal OFREQ has the highest priority. Signal OSREQ, signal TREQE, signal TREQD, or signal IFREQ has the second, third, or fourth priority respectively. The encoded signals are, then, stored into bus attribute flip-flops (F/Fs) 54 and 55 in each bus operation, so as to produce bus attribute informations BAT0 and BAT1. These values BAT0 and BAT1 indicate the bus operation attributes as shown in FIG. 5b.

Figure 6A:
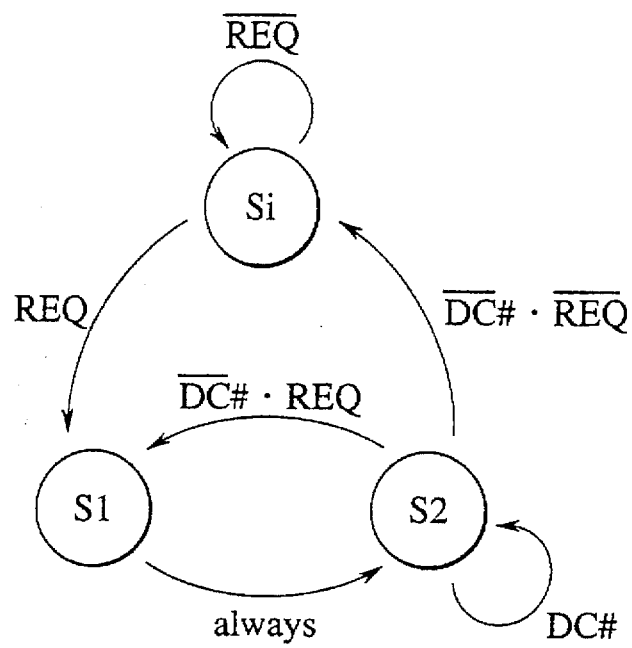
FIG. 6a is a state transition diagram of the bus control unit according to the first embodiment of the present invention.

Bus control unit 24 is controlled according to the state transition diagram shown in FIG. 6a. The data processing apparatus of this embodiment requires two clocks to execute memory access as shown in FIG. 6a. Therefore, this unit 24 provides three states, i.e., an idle state Si, and states S1 and S2 corresponding to said two clocks. Bus control unit 24 transfers between these states as shown in FIG. 6a according to the control by a bus cycle end signal DC# (# means a negative logical signal), and the logical OR signal REQ obtained from instruction fetch request signal IFREQ, operand fetch request signal OFREQ, operand store request signal OSREQ, instruction fetch signal TGREQ of a branch destination.

Figure 6B:
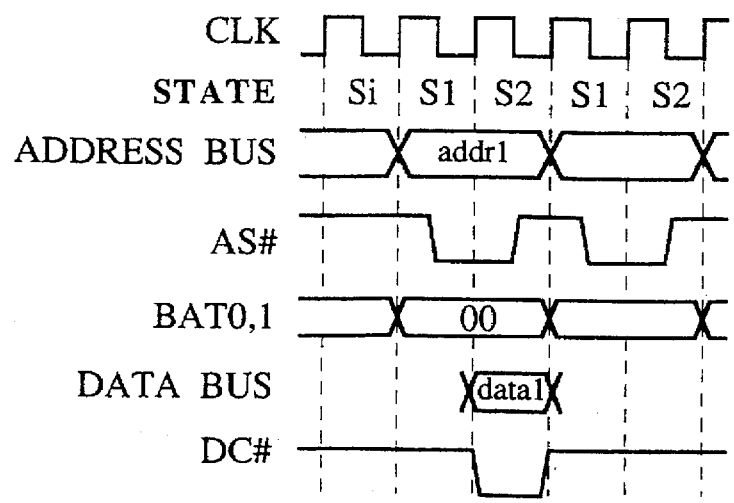

For example, an instruction fetch bus cycle is carried out according to the timing chart shown in FIG. 6b. Receiving instruction fetch request signal IFREQ, unit 24 transfers from idle state Si to state S1. As a result, an address addr1 is output on the address bus, and address strobe start signal AS# becomes an active state. As well, bus attribute informations BAT0 and BAT1 are set at (00), to confirm that the attribute of bus operation is an instruction fetch bus cycle. Unit 24 transfers into state S2 at the next clock, allowing data1 to be output from a memory onto the data bus. When MPU fetches data1 on the data bus, bus cycle end signal DC# becomes an active stare to complete the bus cycle.

Figure 4:
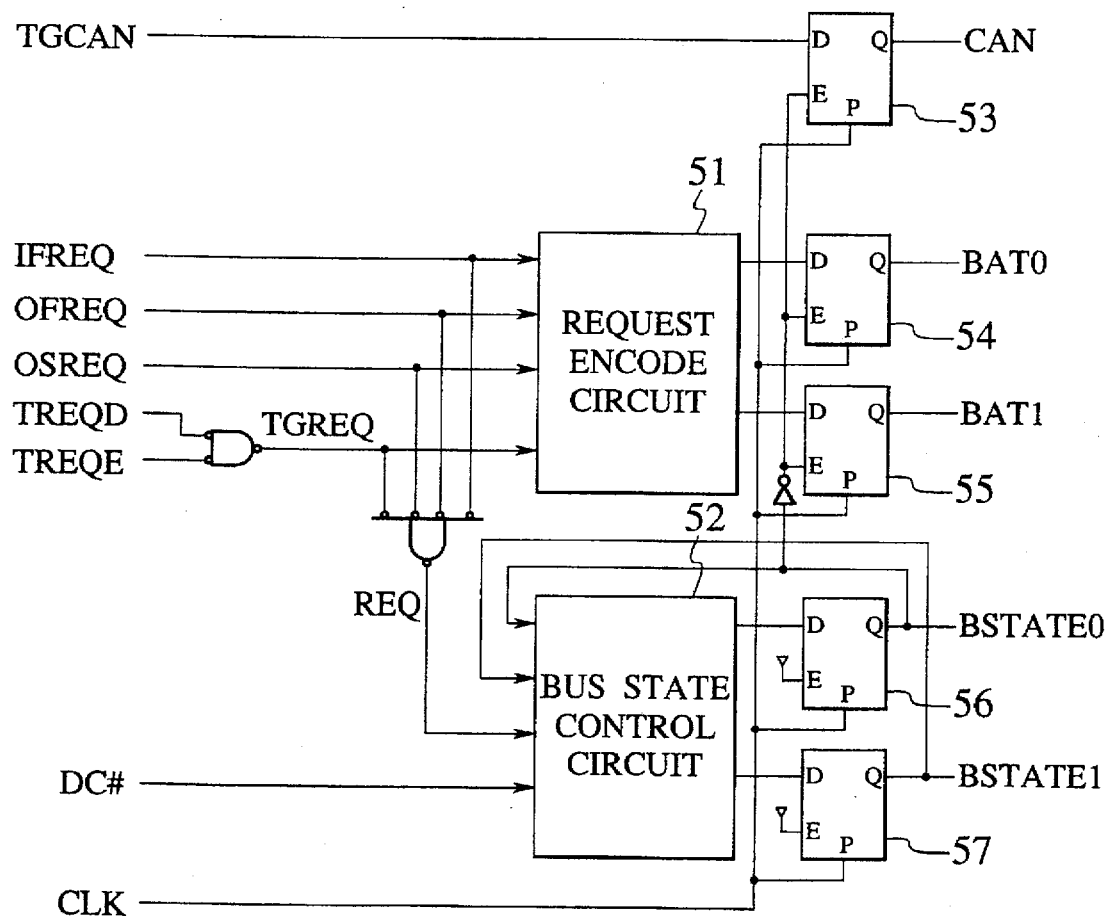
FIG. 4 is a detailed circuit diagram of the bus control unit contained in said first embodiment.

The bus state control circuit 52 shown in FIG. 4, output signals BSTATE0 and BSTATE1 from bus state F/Fs 56 and 57, bus cycle end signal DC# and logical OR signal REQ are input to determine the bus state of the next cycle. As shown, signal REQ is obtained by taking a logical OR among request signals IFREQ, OFREQ, OSREQ, and TGREQ. In actuality, output signals from bus state control circuit 52 are stored into bus state F/Fs 56 and 57 in every clock. Therefore, output signals BSTATE0 and BSTATE1 from these F/Fs 56 and 57 indicate the bus operation state of the particular clock. The relation between the values of signals BSTATE0 and BSTATE1, and bus operations is shown in FIG. 5c.

When execution unit 23 determines that the branch instruction does not satisfy the branch conditions, an instruction cancelling signal TGCAN of the branch destination is sent to bus control unit 24. Then, a cancelling information F/F 53 stores this signal TGCAN inside in each bus operation, in order to output a cancelling signal CAN of a branch destination.

As described above, the data processing apparatus of this embodiment outputs branch destination cancelling signal CAN and bus attribute informations BAT0 and BAT1, each of which is in synchronous with bus cycles. In order to conduct a real time trace of the above mentioned data processing apparatus, an incircuit emulator analyzes the trace memory under the control of a microprogram. One example of the analysis procedure will be described below.

(1) To search an instruction fetch bus cycle of a branch destination from the first address of the trace memory.

(2) To conduct a reverse assemble from the bus cycle searched at step (1) to the next instruction fetch bus cycle of a branch destination, or to the bus cycle in which branch destination cancelling signal CAN is output.

(3) To repeat step (1) and step (2) as far as the last address of the trace memory.

(4) To search instructions of the same address by tracing backward the trace memory from the instruction in which branch destination cancelling signal CAN is output.

(5) To delete instructions, from one which was searched at step (4) to one which is just before the instruction in which said cancelling signal CAN was output.

(6) To repeat step (4) and step (5) as far as the last instruction.

(7) To search an unconditional branch instruction, or a conditional branch instruction having a branch destination address which is same as that of the instruction from which this search was started, by tracing backward the trace memory from the instruction which was fetched at the instruction fetch bus cycle of the branch destination.

(8) To delete instructions, from one which is just after the instruction searched at step (7) to one which is just before the instruction from which the search was started.

(9) To repeat step (7) and step (8) as far as the last instruction.

Said steps (4) to (6) are provided in order to delete the instruction which is purged due to the incompletion of branch conditions of a branch instruction even though the instruction has been predicted to complete the branch conditions. Also, said steps (7) to (9) are provided in order to delete instructions which are purged as the result of the execution of a branch instruction.

As explained above, in the data processing apparatus of this embodiment having facilities for instruction prefetch of a branch destination and branch prediction, particular information regarding conditional branch instructions can be easily deleted from trace information of instruction fetch bus cycles stored in the trace memory of an incircuit emulator, according to the incompletion of branch conditions.

Next, the operation of this embodiment will be explained using the program shown in FIG. 19 as an example, the program which has been used to explain the operation of the prior art device.

FIG. 7a shows the flow of pipe line stages and FIG. 7b shows the timing chart of signals. In both figures a common time axis is used.

First, at time 1, instruction fetch request signal IFREQ becomes active to set time 1 at an instruction fetch bus cycle. Thus, instruction 1 (MOV instruction) and instruction 2 (ADD instruction) are fetched. Next, at time 2, instruction 3 (CMP instruction) is fetched, and also instruction 1 is decoded. At time 3, instruction 4 (BNE instruction) and instruction 5 (SUB instruction) are fetched, and also instruction 2 is decoded In addition, the operand address contained in instruction 1, which is in a register indirect addressing mode, is calculated. As a result, operand fetch request signal OFREQ becomes active to set time 4 at an operand fetch bus cycle. Therefore, at time 4, the operand in instruction 1 (the memory content in an address pointed by register R6) is fetched and instruction 3 is decoded. At time 5, instruction 1 is executed, and the address calculation of instruction 3, which is in a direct addressing mode, is carried out. As a result, instruction 6 (MOV instruction) and instruction 7 (ADD instruction) are fetched. At this time, operand fetch request signal OFREQ becomes active to set time 6 at an operand fetch bus cycle. Thus, the operand of instruction 3 (the memory content in address 4000) is fetched and instruction 2 is executed. As well, instruction 4 is decoded. Because instruction 4 is a branch instruction, instruction fetch request signal TREQD of a branch destination obtained from unit 21 becomes active to set time 7 at an instruction fetch bus cycle of the branch destination. In actuality, at time 7, instructions 6 and 7, which exist in the destination of the branch instruction, are fetched again, and instruction 3 is executed. Next, at time 8, instructions 8 and 9 are fetched and decode calculation of instruction 6 is executed. At the same time, instruction 4 is also executed. By executing instruction 4 at time 8, it is found that instruction 4 does not satisfy branch conditions. Therefore, instruction cancelling signal TGCAN of the branch destination becomes active. As a result, instruction 5, which is next to instruction 4, is fetched at time 9. At the same time, instruction cancelling signal CAN becomes active. In the same manner, the following instructions are continuously fetched to complete the pipe line process.

FIG. 8 shows the trace informations which has been stored in the trace memory of the incircuit emulator. This information has been obtained by executing the program shown in FIG. 19 using the data processing apparatus of this embodiment. In FIG. 8, columns having *1 indicate that these are the prefetch of instructions in branch destinations. These prefetched instructions have been purged due to the incompletion of branch conditions. Therefore, these informations should be deleted at steps (4) to (6) mentioned above. On the other hand, columns having *2 indicate that these are the prefetch of instructions which have been purged as the result of precedence branch. Therefore, these informations should be deleted at steps (7) to (9). FIG. 9 shows the analyzed result of the trace informations shown in FIG. 8.

This invention is not limited to the data processing apparatus of this embodiment in which branch prediction is conducted. This invention is also effective in a data processing apparatus in which instructions in the destinations of conditional branch instructions are unconditionally prefetched.

This embodiment can also be realized as a data processing apparatus of stored program. The structure of this apparatus is shown in FIG. 10.

Figure 10:
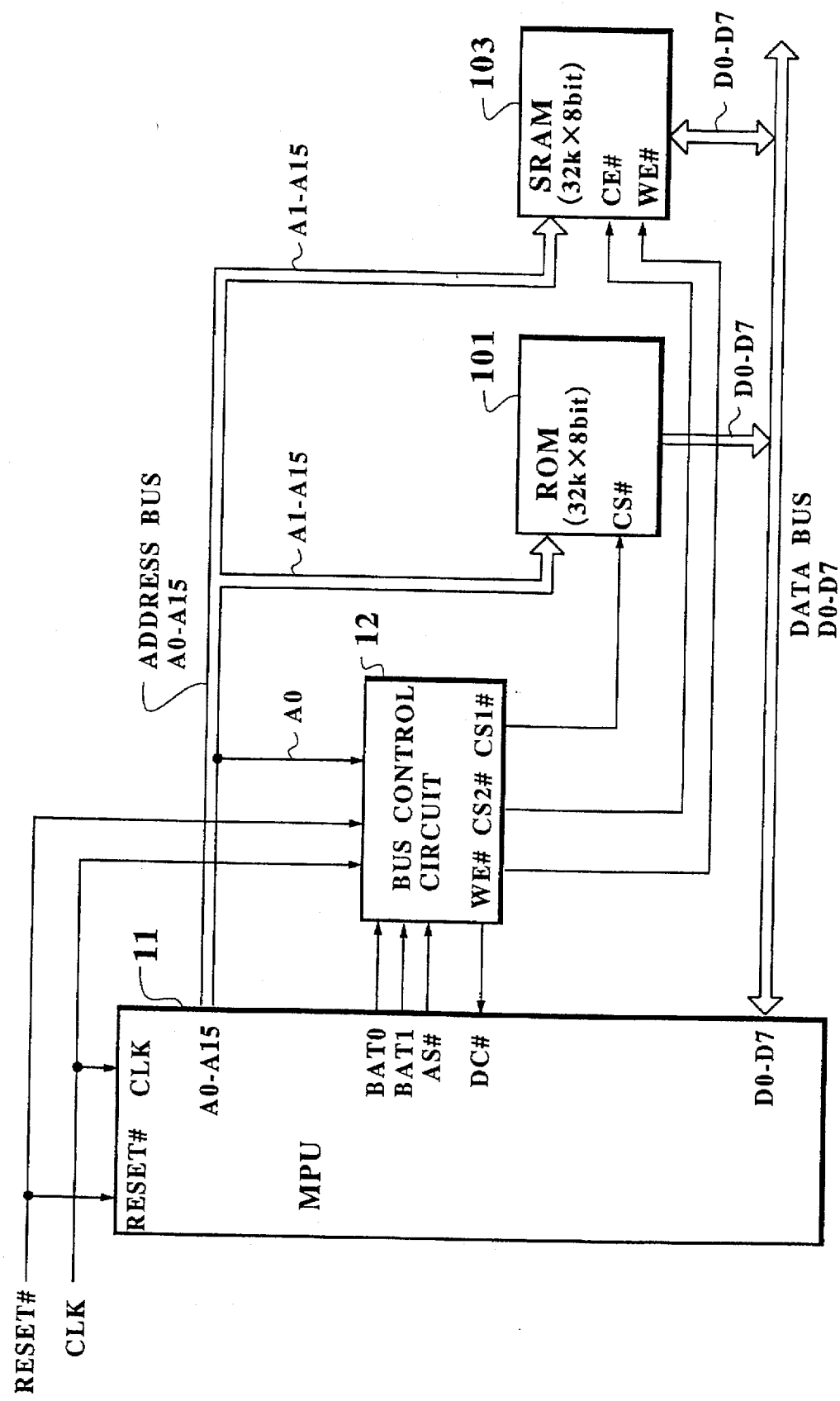
FIG. 10 is a schematic diagram showing a data processing apparatus of stored program according to the first embodiment of the present invention.

As shown in FIG. 10, the data processing apparatus of stored program is comprised of the following: a microprocessing unit (referred to as MPU, below) 11 in which an instruction decode unit, an operand address calculation and fetch unit, an execution unit, and a bus control unit are incorporated; a bus control circuit 12 for the production of memory control signals and a bus cycle end signal according to the control signals obtained from said MPU 11; a ROM (Read Only Memory) 101 of 32K×8 bit size which is used to store programs; and an SRAM (Static Random Access Memory) 103 of 32K×8 bit size which is used to store data.

The access to ROM 101 and SRAM 103 is carried out through address bus A0 to A15 and data bus D0 to D7. Control signals from MPU 11 include bus attribute informations BAT0 and BAT1, and address strobe signal AS# which shows that the values on address bus A0 to A15 are valid. Bus cycle end signal DC# is output from bus control circuit 12, and supplied into MPU 11.

First chip select signal CS1# from bus control circuit 12 is supplied into the CS# terminal of ROM 101, thus controlling the program read out from ROM 101. Second chip select signal CS2# and write enable signal WE# are supplied into the CE# and WE# terminals of SRAM 103 respectively. These signals control the data read out from and data writing to SRAM 103.

Generally speaking, the access time of a ROM is longer than that of an SRAM. Accordingly, if a bus cycle time is set to the access time of an SRAM, enough time can't be obtained to access a ROM. Therefore, a wait cycle is incorporated into a bus cycle in this embodiment so as to ensure enough time to access ROM 101.

Figure 11:
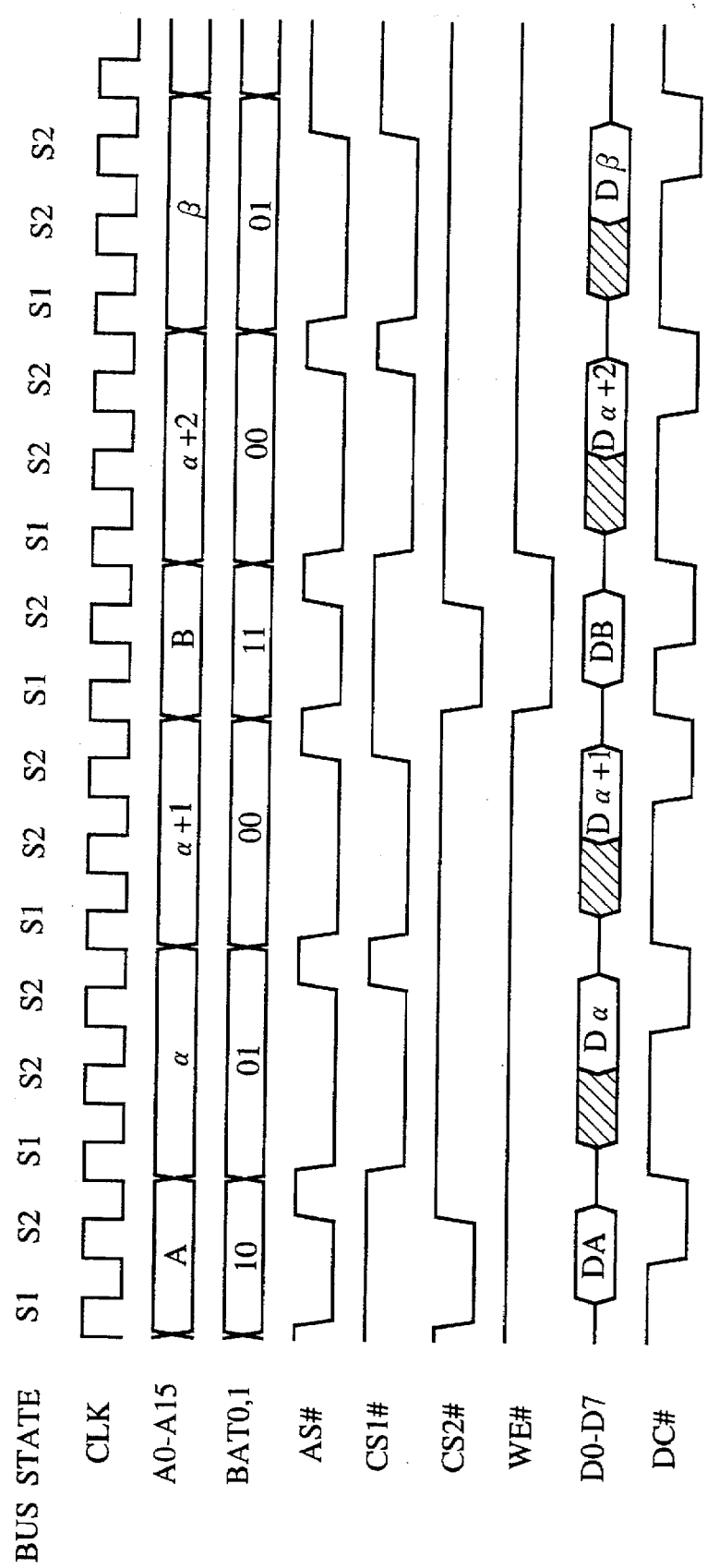
FIG. 11 is a timing chart showing the bus cycles of the data processing apparatus of stored program shown in FIG. 10.

FIG. 11 shows the timing chart of bus cycles used in order to operate the data processing apparatus of stored program shown in FIG. 10. The basic bus cycle is executed by two cycles, i.e., state S1 and state S2. At the falling of clock signal CLK in state S2, bus cycle end signal DC# is sampled. In this case, if bus cycle end signal DC# being sampled is at level H, a wait cycle is incorporated to repeat state S2 cycle. On the other hand, if bus cycle end signal DC# being sampled is at level L, the bus cycle is completed at the end of this cycle. In the example shown in FIG. 11, one operand fetch bus cycle (in the figure, the read out of data DA by address A) and one operand write cycle (in the figure, the read out of data DB by address B) require two cycles respectively to access SRAM 103. On the other hand, one instruction fetch bus cycle (in the figure, the read out of data D α+1 and D α+2 by addresses α+1 and α+2), and one instruction fetch bus cycle of a branch destination (in the figure, the read out of dataα and β by addresses α and β) require three cycles respectively to access ROM 101.

Figure 12:
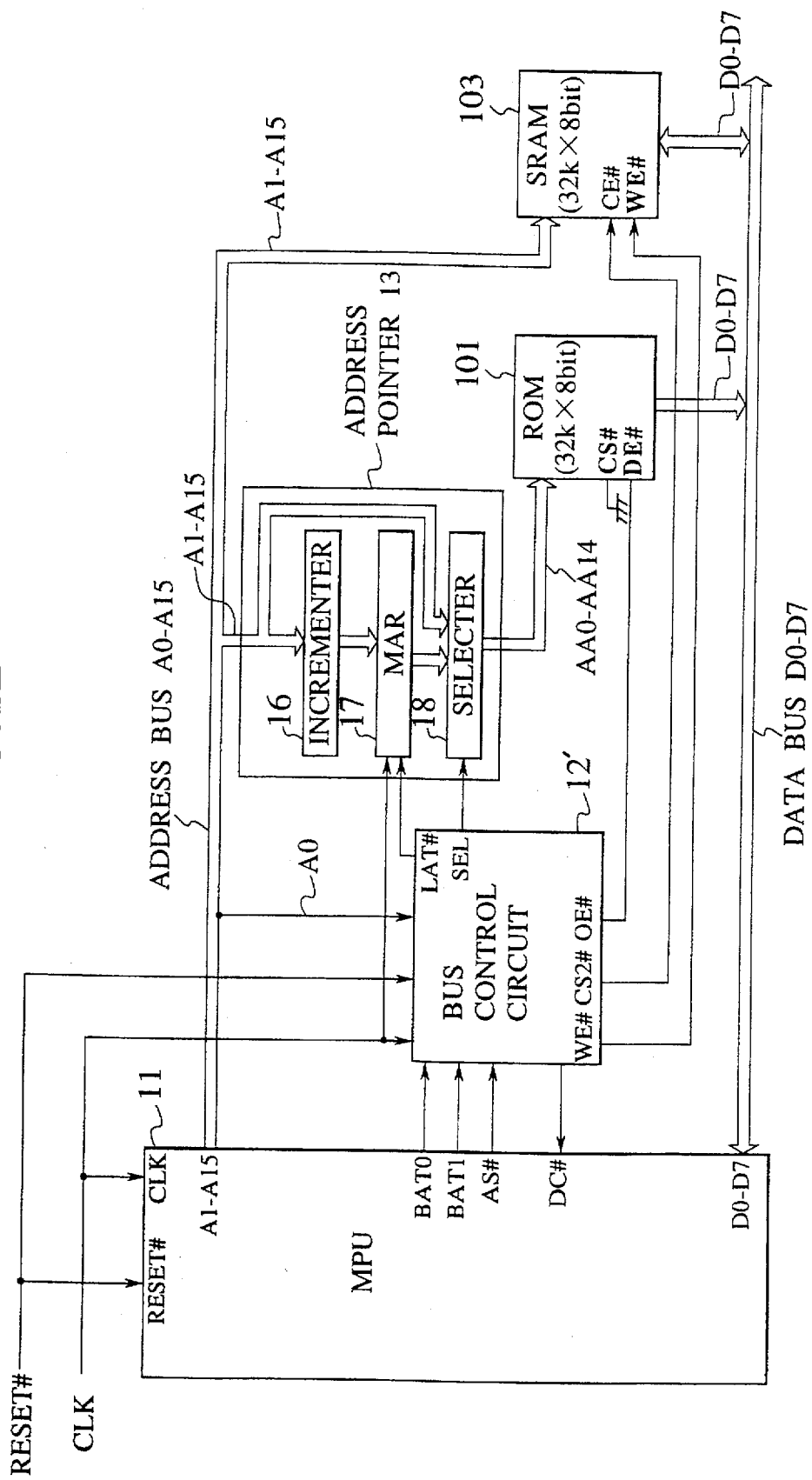
FIG. 12 is a schematic diagram of the data processing apparatus according to the second embodiment of the present invention.

In FIG. 12, the structure of a data processing apparatus is shown according to the second embodiment of the present invention.

As shown in FIG. 12, the data processing apparatus of this embodiment is comprised of the following: a ROM 101 of 32K×8 bit size for storing programs; SRAM 103 of 32K×8 bit size for storing data; an MPU 11 which operates according to instructions obtained from ROM 101, said MPU 11 having instruction decode unit 21, operand address calculation and fetch unit 22, execution unit 23, and bus control unit 24 as explained in the first embodiment; a bus control circuit 12' for generating control signals for ROM 101 and SRAM 103, and bus cycle end signal DC# according to the control signals from MPU 11; and an address pointer 13 for generating access addresses for ROM 101.

Said address pointer 13 is comprised of an incrementer 16 of 15 bits, a memory address register (referred to as MAR, below) 17 of 15 bits, and a selector 18 of 15 bits. The access for ROM 101 and SRAM 103 is carried out through address bus A0 to A15 of 16 bits and data bus D0 to D7 of 8 bits.

Figure 13:
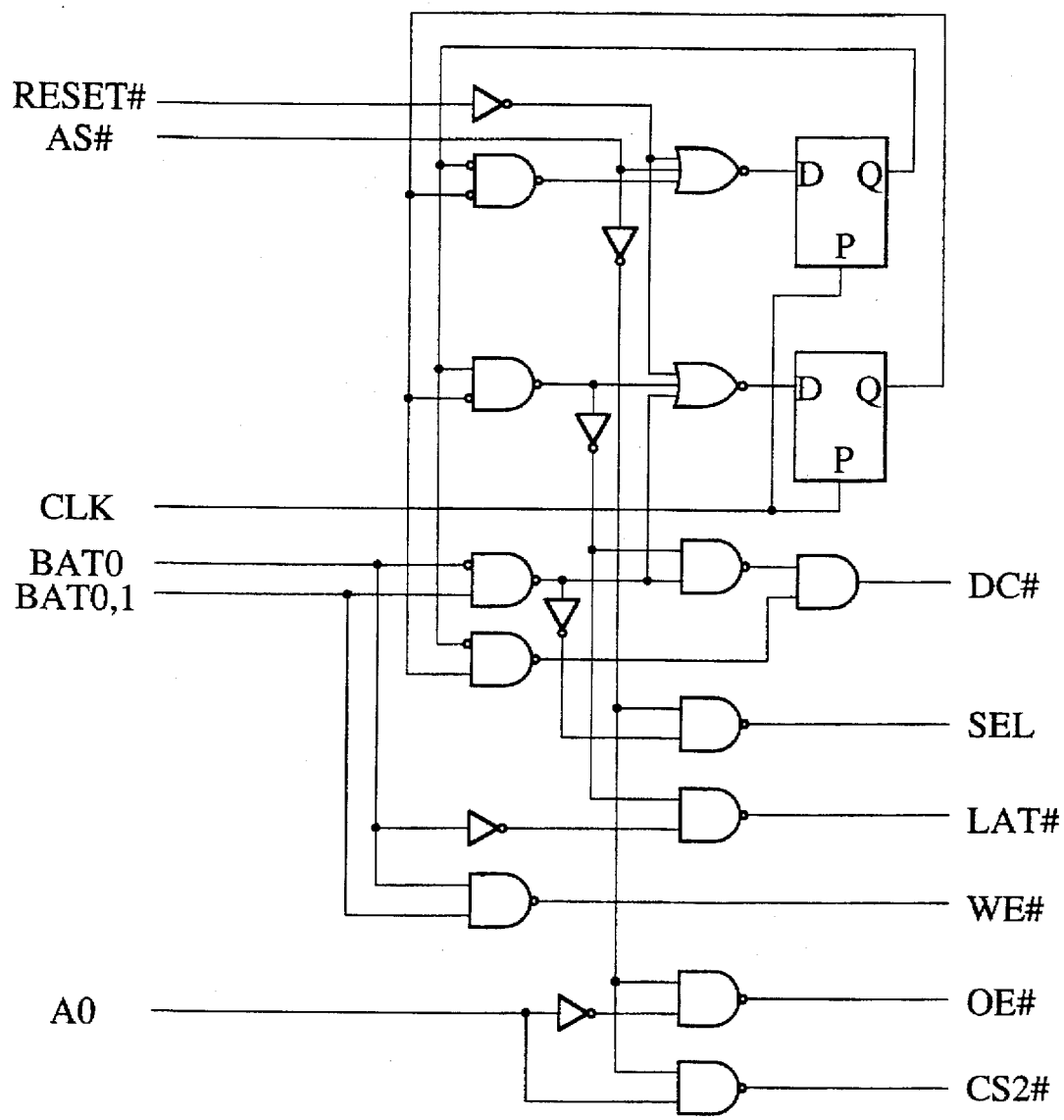
FIG. 13 is a circuit diagram showing the structure of the bus control circuit shown in FIG. 12.

The control signals supplied into bus control circuit 12' from MPU 11 include bus attribute informations BAT0 and BAT1, and address strobe signal AS# which indicates that the values on address bus A0 to A15 are valid. Circuit 12' still inputs a reset signal RESET#, a clock signal CLK, and an address signal A0, to produce a various kind of control signals. The logical structure of bus control circuit 12' is shown in FIG. 13. This circuit 12' outputs bus cycle end signal DC# into MPU 11, latch enable signal LAT# into MAR 17 contained in address pointer 13, and select signal SEL into selector 18 respectively. Also, output enable signal OE# from bus control circuit 12' is supplied into OE# terminal of ROM 101, thus controlling the read out of programing information from ROM 101. Second chip select signal CS2# and write enable signal WE# are supplied into CE# and WE# terminals in SRAM 103 respectively, thus controlling the data read out from and data writing to SRAM 103.

Figure 14:
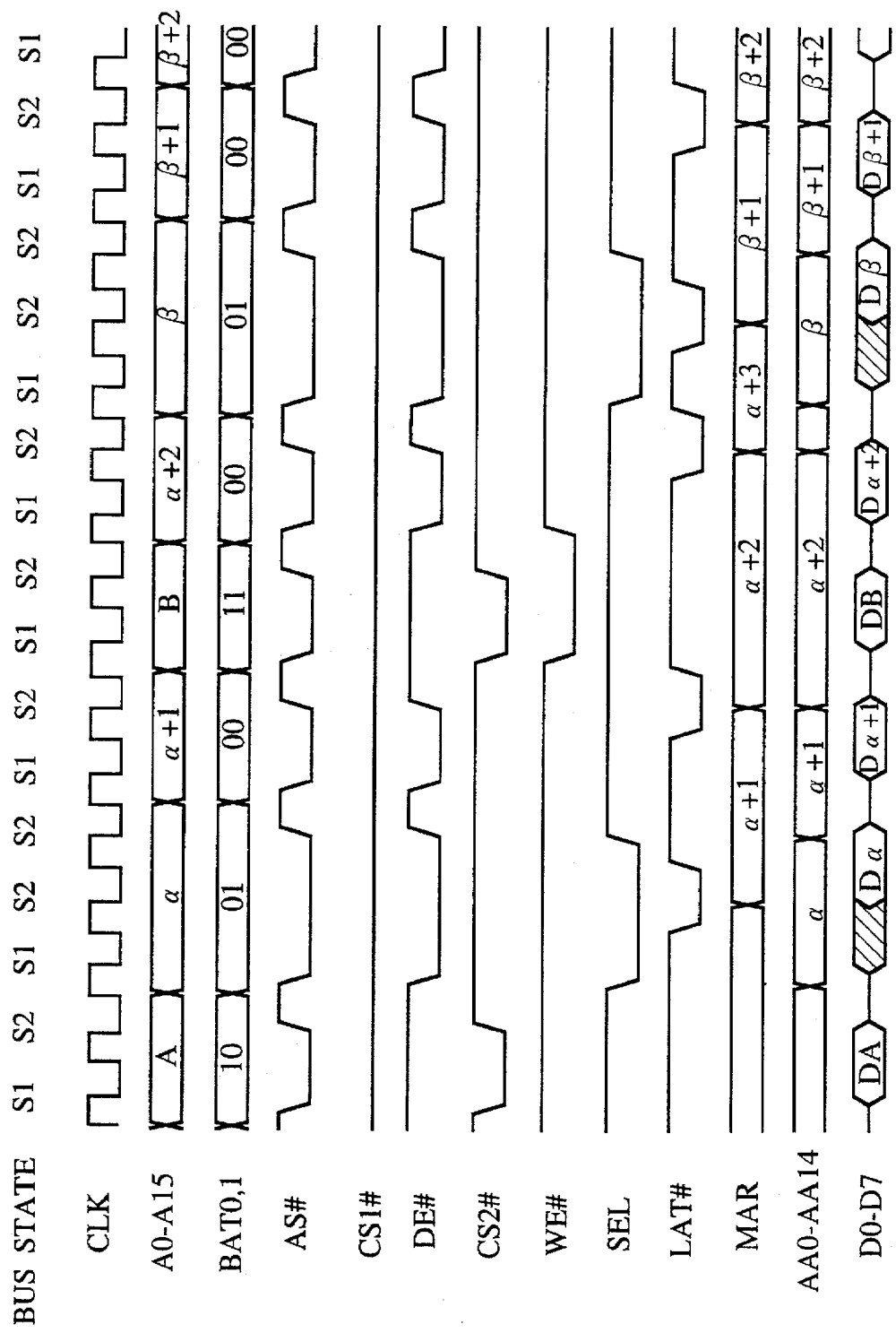
FIG. 14 is a timing chart of the data processing apparatus shown in FIG. 12.

FIG. 14 shows the timing chart of the data processing apparatus of this embodiment.

As shown in the figure, while the highest bit A0 in address bus A0 to A15 is at level H, second chip select signal CS2# stays at level L only when address strobe signal AS# is at level L. As a result, SRAM 103 is accessed. In this case, if bus attribute information BAT1 is at level H, write enable signal WE# comes into level H to set the present bus cycle at a read bus cycle. Thus, while second chip select signal CS2# is at level L, the read out data from SRAM 103 are output onto data bus D0 to D7. On the contrary, if bus attribute information BAT1 and write enable signal WE# are at level L, the present bus cycle becomes a write bus cycle. Thus, at the rising edge of second chip select signal CS2#, the data on data bus D0 to D7 are written into SRAM 103.

While select signal SEL is at level L, the output from MAR 17 is supplied into the address terminal of ROM 101 through selector 18. On the contrary, while select signal SEL is at level H, address bus A1 to A15 is supplied into the address terminal of ROM 101 through selector 18. Said select signal SEL comes into level L when bus attribute information BAT0 is at level L, bus attribute information BAT1 is at level H, and address strobe signal AS# is at level L. To access ROM 101, output enable signal OE# comes into level L when address signal A0 and address strobe signal AS# are at level L. At this time, read out data from ROM 101 are output onto data bus D0 to D7.

Next, the operation of address pointer 13 will be explained. Incrementer 16 of 15 bits adds 1 to each value of address bus A1 to A15, and outputs the resulting values. MAR 17 latches the output of incrementer 16 at the falling edge of clock signal CLK when latch enable signal LAT# is at level L. This latch enable signal LAT# comes into level L when bus attribute information BAT0 is at level L during state S2.

Selector 18 of 15 bits outputs address bus A1 to A15 as the access address for ROM 101 when select signal SEL is at level L. On the other hand, when select signal SEL is at level H, selector 18 provides the output signals from MAR 17 as the access address for ROM 101.

Accordingly, the access for ROM 101 in an instruction fetch bus cycle is prepared in advance by incrementer 16 and MAR 17, as shown in FIG. 14. So, memory access can be executed in this embodiment without providing a wait cycle, unlike the first embodiment.

Therefore, the apparatus of this embodiment can overcome the problems arising from the increase of cycle numbers which are required to execute an instruction fetch bus cycle. For example, in the prior art devices, an extra number of cycles are required to execute an instruction fetch bus cycle, thus deteriorating the system performance. Also, in the prior art devices, the bus occupation rate of an instruction fetch bus cycle becomes high due to said increase of cycle numbers, thus deceasing the bus occupation rate of an operand access bus cycle, and so, deteriorating the system performance. These problems in the prior art devices can be solved in this embodiment as mentioned above.

Figure 15A:
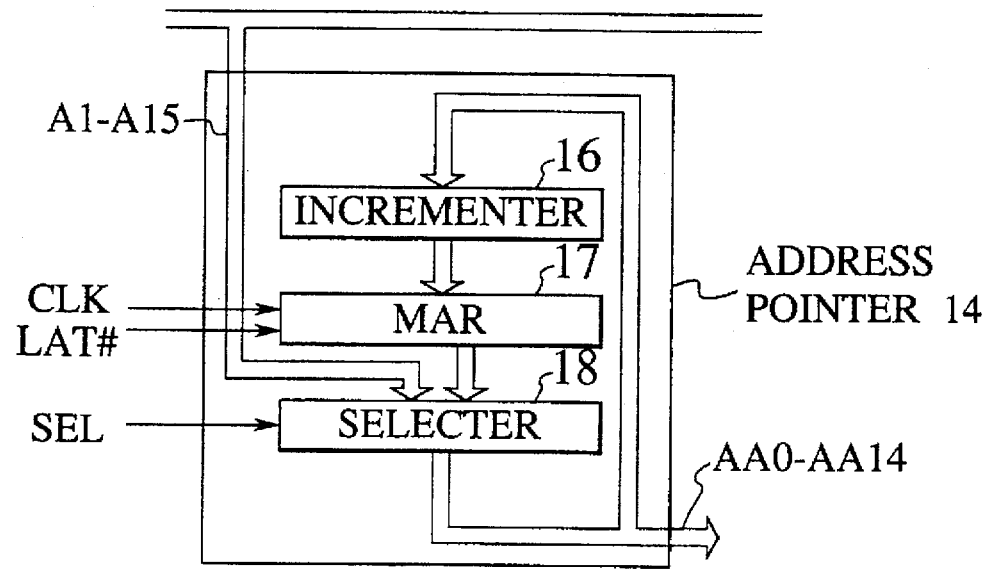
FIGS. 15a and 15b are schematic diagrams showing alternative structures of the address pointer shown in FIG. 12.
Figure 15B:
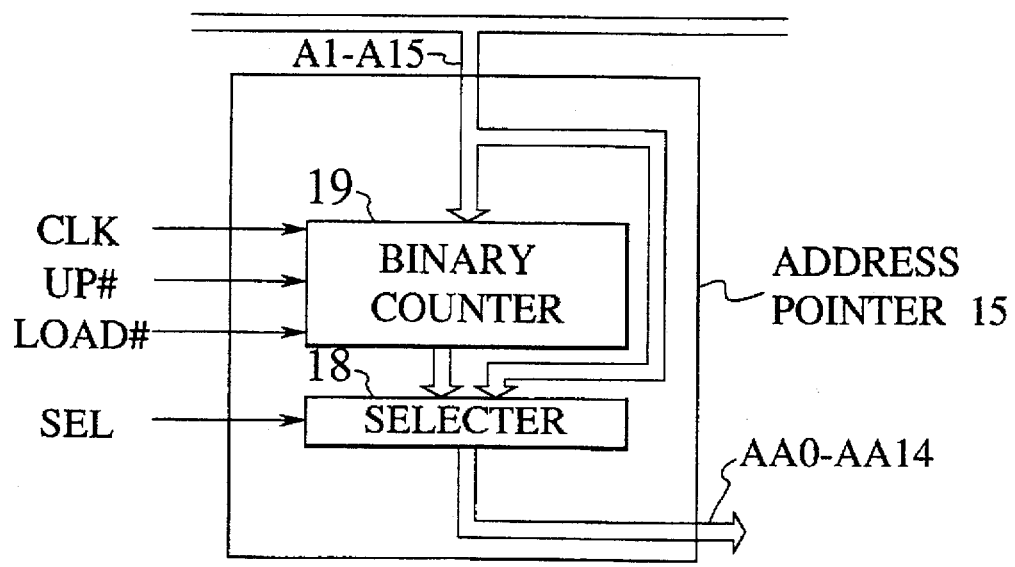

The address pointer 13 shown in FIG. 12 may be constructed as shown in FIG. 15a. In actuality, address pointer 14 is constructed using the output from selector 18 as the input to incrementer 16. Or, address pointer 15 is constructed as shown in FIG. 15b using a binary counter 19 in place of incrementer 16 and MAR 17 shown in FIG. 15a. These address pointers 14 and 15 have the same advantage as that of the embodiment shown in FIG. 12.

In addition, this embodiment uses data bus D0 to D7 of 8 bit width. Therefore, an instruction, which is fetched by one bus cycle, has one byte size, so that 1 is added in incrementer 16. In the case where data bus having 16 bit width is used, 2 should be added in incrementer 16 to calculate the next read out address of ROM 101. In the same manner, 4 should be added when data bus having 32 bit width is used.

In summary, the data processing apparatus of this invention is constructed to execute prefetch of an instruction in a branch destination, prior to the confirmation of branch conditions of a conditional branch instruction. In this apparatus, when the prefetched information should be abandoned, the information regarding the event is output outside the apparatus in synchronous with the next instruction fetch bus cycle. Accordingly, in the case to trace the execution sequence of this apparatus using an incircuit emulator, instructions, which have been purged due to the incompletion of branch conditions, are easily deleted from the trace information stored in a trace memory. As a result, the trace information can be easily analyzed in this apparatus, thus providing a data processing apparatus in which the trace of execution sequence is easily conducted.

In addition, if bus attribute information output means indicates that the bus cycle under operation is an instruction fetch bus cycle in the destination of a conditional or unconditional branch instruction, address generation means adds n (byte number of data bus) to the values on address bus using addition means, and stores the resulting values into address memory means. Accordingly, in order to access instructions which will occur after the unconditional or conditional branch instruction, the values stored in address memory means are selected with address selecting means so as to access memory means. Thus, the data processing apparatus of this invention is able to fetch said instructions, which will occur after the unconditional or conditional branch instruction, with smaller number of cycles. So, this invention provides a data processing apparatus having high system performance.

What is claimed is:

1. A system for compiling an accurate trace of an execution sequence to facilitate debugging, comprising:

a first unit requesting an instruction fetch for executing an instruction decode, branch prediction, and precedence branch of a branch instruction;

a second unit for calculating operand addresses requesting an operand fetch;

a third unit for executing instructions and requesting an operand store;

a trace memory for storing a trace of the instructions fetched by said first unit; and a bus control unit connected to said first, second and third units for conducting bus cycles according to an instruction fetch request signal from said first unit, an operand fetch request signal from said second unit, and an operand store request signal from said third unit, wherein said bus control unit outputs a bus attribute signal indicating that an instruction at a destination of a conditional branch instruction has been fetched prior to execution of the conditional branch instruction, and outputs a debug information signal indicating that the conditional branch instruction did not satisfy its branch conditions upon execution of said conditional branch instruction by said third unit, and wherein the trace stored in said trace memory is corrected in accordance with the bus attribute signal and the debug information signal.

2. The system as claimed in claim 1, wherein said bus control unit further outputs information regarding an instruction fetch bus cycle, an operand fetch bus cycle, and an operand write bus cycle as attributes of bus operation.

3. The system as claimed in claim 1, wherein said bus control unit further outputs state indication signals for indicating states of bus operations.

4. The system as claimed in claim 3, wherein said bus operations have three states, in which a first state Si is an idle state, and second and third states S1 and S2 are for use in memory access.

5. The system as claimed in claim 1, wherein said first, second, third, and bus control units are incorporated in a microprocessing unit, and further comprising:

a bus control circuit for generating memory control signals and a bus cycle end signal according to control signals from said microprocessing unit;

a ROM for storing programs;

a RAM for storing data; and address and data buses.

6. The system as claimed in claim 1, wherein the trace stored in said trace memory is corrected by purging portions of the trace corresponding to instructions that were fetched prior to execution of the condition of the conditional branch instruction.

7. The system as claimed in claim 1, further comprising an incircuit emulator for storing the trace in said trace memory and correcting the trace stored in said trace memory in accordance with the bus attribute signal and the debug information signal supplied thereto.

8. A system for compiling an accurate trace of an execution sequence to facilitate debugging, comprising:

a data processing circuit including a first unit requesting an instruction fetch for executing an instruction decode, branch prediction, and precedence branch of a branch instruction;

a second unit for calculating operand addresses requesting an operand fetch;

a third unit for executing instructions and requesting an operand store;

a bus control unit connected to said first, second and third units for conducting bus cycles according to an instruction fetch request signal from said first unit, an operand fetch request signal from said second unit, and an operand store request signal from said third unit; and a debug facilitating circuit including bus attribute output means for outputting a bus attribute signal indicating that an instruction at a destination of a conditional branch instruction has been fetched prior to execution of the conditional branch instruction and signal output means for outputting a debug information signal indicating that the conditional branch instruction did not satisfy its branch conditions upon execution of said conditional branch instruction by said third unit, said bus attribute signal and said debug information signal being available external to said data processing unit;

a trace memory for storing a trace of the instructions fetched by said first unit; and an incircuit emulator for storing the trace in said trace memory and correcting the trace stored in said trace memory in accordance with the bus attribute signal and the debug information signal supplied thereto.

* * * * *